United States Patent [19]  
Shifley et al.

[11] Patent Number: 4,869,051  
[45] Date of Patent: Sep. 26, 1989

[54] FILM WRAPPING AND SEALING APPARATUS

[75] Inventors: James D. Shifley, Rochester; Michael T. Dobbertin, Honeoye; Charles R. Hubbard, Spencerport; Wayne W. Forrest, Rochester, all of N.Y.

[73] Assignee: Eastman Kodak Company, Rochester, N.Y.

[21] Appl. No.: 238,786

[22] Filed: Aug. 31, 1988

[51] Int. Cl.⁴ .................. B65B 11/50; B65B 51/14
[52] U.S. Cl. .................................. 53/540; 53/228; 53/373; 156/583.7
[58] Field of Search ............... 53/220, 228, 373, 379, 53/375, 555, 540; 156/583.2, 583.6, 583.7

[56] References Cited  
U.S. PATENT DOCUMENTS

| | | |
|---|---|---|
| 3,191,356 | 6/1965 | Zelnick et al. |
| 3,494,816 | 2/1970 | Fener |
| 3,589,100 | 6/1971 | Konars et al. |
| 3,643,397 | 2/1972 | Bahnsen .......................... 53/228 X |
| 3,748,811 | 7/1973 | Cox ................................. 53/228 X |
| 3,849,968 | 11/1974 | Tateisi |
| 4,359,361 | 11/1982 | Wright ............................. 53/373 X |
| 4,509,314 | 4/1985 | Bozza .............................. 53/228 X |
| 4,617,784 | 10/1986 | Goliez et al. |
| 4,779,400 | 10/1988 | Hoskinson et al. ............. 53/373 X |

OTHER PUBLICATIONS

The Vertrod Guide to Thermal Impulse Heat Sealing Machinery, "Table of Contents" (p. 2) and Standard Vertrod Thermal Impulse Heat Sealing Machines (p. 9), (Oct. 1986).

Primary Examiner—Horace M. Culver  
Attorney, Agent, or Firm—J. R. Hanway

[57] ABSTRACT

Apparatus for wrapping and sealing stacks of paper sheets from the output of high speed copiers and printers. The apparatus includes a paper handling assembly, a sealing assembly, rolls of a plastic film material, and a tote or hopper system. The paper handler permits single sheet feeding and inverting of sheets when desired. The sealing assembly wraps the stack of sheets with the plastic film and lowers a U-shaped sealing bar assembly around the wrapped package to seal simultaneously three sides thereof. Two of the three sides are parallel and near the edge of the plastic film, and are sealed with non-severing type seams. The third side is perpendicular to the other two sides and is sealed with a severing type seam. The severing type seam is made with a heating element on one side of the sealed plastic layers, and a non-heated cut-off wire located on the other side. The cut-off wire is also used to control the temperature in the seal area.

23 Claims, 3 Drawing Sheets

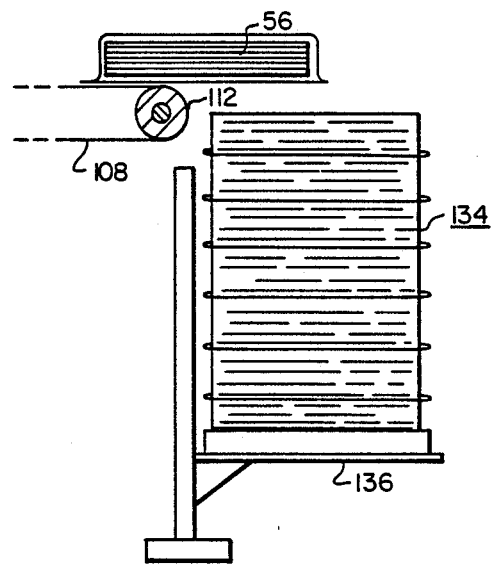
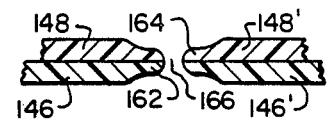
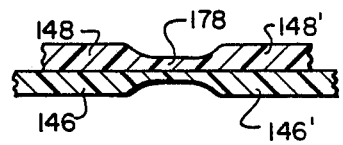
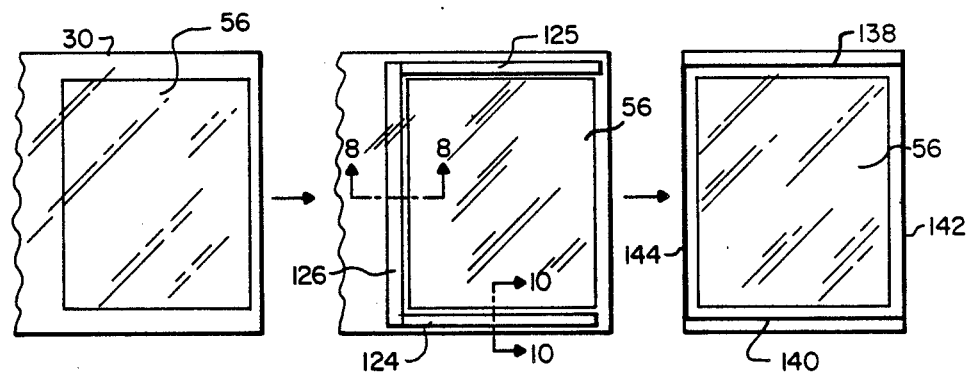
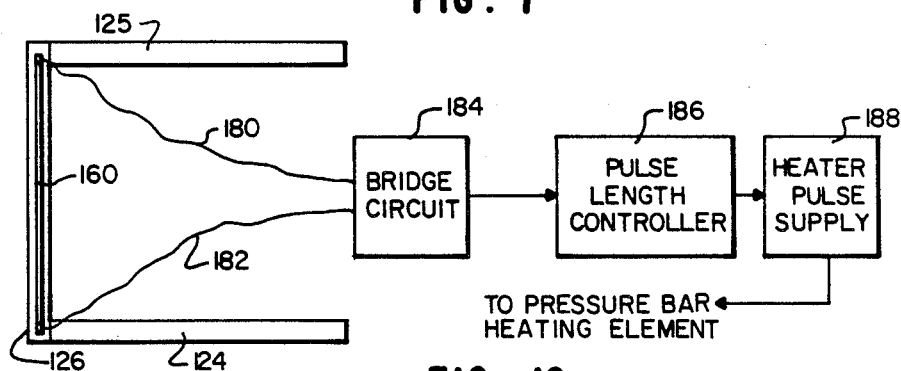

FILM WRAPPING AND SEALING APPARATUS

BACKGROUND OF THE INVENTION

1. Field of the Invention

This invention relates, in general, to wrapping and sealing with a thin film material and, more specifically, to wrapping and sealing stacks of printed sheets with a plastic film.

2. Description of the Prior Art

High speed printers, duplicators, and copiers are often required to produce copy sheets which are arranged in stacks. The stacks of sheets may consist of collated complete documents from the printer-copier, a fixed quantity of similar sheets, or any other multiple sheet stack which should be kept together.

Keeping such stacks of sheets together has taken many forms according to the prior art. Stapling, binding, wrapping, and stitching are but a few of the methods used to maintain the integrity of the stack once it leaves the output tray, tote, or hopper of the printer. Another desirable arrangement is to wrap a plastic film around the stack and seal together the film layers so that the sheets are neatly held in register with one another. Plastic wrapping offers the advantages of providing an impressive looking cover, see through capability for ease in address reading, and the ability to be mailed or shipped directly from the printer without further material and labor consuming operations.

While plastic wrapping and sealing apparatus has been known in the prior art, such apparatus is not ideally suited to applications involving high speed printers and copiers for various reasons. Therefore, it is desireable, and it is an object of this invention, to provide plastic wrapping and sealing apparatus which is specifically suitable for use with high speed printers and copiers, particularly with respect to the size and speed of the wrapping and sealing apparatus. It is also an object of this invention to provide a sealing arrangement which monitors the heat applied to the seal area according to a new and advantageous arrangement not known according to the prior art.

Several U.S. patents have been examined to determine the state of the prior art relative to the inventive concepts contained in this application. Expired U.S. Pat. No. 3,191,356, issued June 29, 1965, illustrates a wrapping and sealing machine which is somewhat similar to some aspects of the present invention. However, the apparatus of the referenced patent requires two stages or stations to seal all the edges of the package rather than sealing the edges simultaneously at the same section, thereby requiring valuable machine space and time. It is also noted that the parallel sides of the package according to the reference are sealed and the excess plastic is cut-off, unlike the present invention. Other differences between this reference and the present invention include the paper handling capabilities, the cut-off seal mechanism, and the manner in which the heat applied to the seal area is controlled.

U.S. Pat. No. 4,509,314, issued on Apr. 9, 1985, discloses a machine to band wrap a plurality of boxes with a plastic material. This reference uses a special lower feed mechanism which permits the use of a single roll of wrapping material. It is noted that the present invention differs from this reference because, among other differences, this reference does not seal the sides of the stack of boxes, does not lend itself to moving stacks of sheets into engagement with the plastic material, and uses a very different sealing and cut-off system.

U.S. Pat. No. 3,849,968, issued Nov. 26, 1974, discloses a packaging system which can seal a plastic wrap around sheets of paper. However, the cutting or severing of the plastic wrap is not performed during the sealing operation but rather at a separate location and in a different step of the process. Additionally, the sealing system is considerably different than that of the present invention.

Although the referenced patents show some similarities to certain separate features of the present invention, they do not provide the ability to quickly wrap a stack of sheets from a printer or copier within a relatively small enclosure. None of the references use or teach a sealing arrangement similar to that in the present invention, nor do they disclose the heat regulation system used in the present invention.

SUMMARY OF THE INVENTION

There is disclosed herein new and useful apparatus for plastic wrapping and sealing stacks of paper sheets from the output of high speed printers and copiers. The wrapping and sealing apparatus includes a paper handling assembly, a sealing assembly, a hopper or tote assembly, and two rolls of a plastic film material. The paper handling assembly is configured for placement adjacent to the output of the printer or copier whereby the sheets are fed into a paper path, or channel, which ultimately leads to a stacking position. A J-inverter is used when required to invert any sheets from the printer or copier before being placed upon the stack. The paper handling assembly also includes means for feeding individual sheets from an auxiliary supply onto the stack to be wrapped and sealed.

Once the stack is acquired, it is pushed into engagement with the plastic film material which is driven at the same speed that the stack is being pushed, thereby wrapping the film material around the stack of sheets. Once wrapped, the sealing assembly uses a U-shaped sealing bar assembly to simultaneously seal three of the sides of the wrapped package or stack of sheets. The sides which extend along the edges of the plastic material are sealed with a non-severing type seam and the seal area extending across the plastic film between the two sealed edges is sealed with a severing type seam. Once completely sealed, the sealed package is conveyed out of the sealing station and into the tote (hopper system) for movement into other areas.

The wrapping and sealing apparatus of this invention uses a unique sealing system whereby three of the sides of the package are sealed simultaneously with different types of seals. The seals are performed by moving pressure bar assemblies, located on opposite sides of the plastic layers, together and applying heat to the seal area. For the non-severing type seams, the heat is applied by a flat electrical heating element located on one side of the plastic and across the face of one of the pressure bar assemblies. For the severing type seam, a similar heating element is positioned on one of the pressure bars, and onto the opposite pressure bar a non-heated cut-off wire is positioned across the face thereof. This non-heated cut-off wire is constructed of an electrical conductor which has a high thermal coefficient of resistivity.

The cut-off wire not only performs the function of cutting, or severing, the two layers of plastic film when they are heated and sealed, but it is also used to regulate the amount of heat applied to the seal area. In this respect, the cut-off wire is connected to an electrical circuit which is responsive to the change in resistance of the cut-off wire. Thus, the heat from the heating element on the opposite side of the plastic layers helps determine the resistance of the cut-of wire. Since they are on opposite sides of the plastic film layers, the actual heat in the seal area is monitored by the cut-off wire. In order to control the temperature of the heating element, the electrical control signal developed by the change in resistance of the cut-off wire is applied to an electrical circuit which controls the length of the impulse time used to heat the heating element. By using such a heat sensing and controlling system, the heat in the actual seal area can be accurately determined and controlled to provide just the right amount of heat necessary to completely seal and sever the seam.

BRIEF DESCRIPTION OF THE DRAWINGS

Further advantages and uses of this invention will become more apparent when considered in view of the following detailed description and drawings, in which:

FIG. 6 is a schematic elevational view of the tote assembly shown in FIG. 1;

FIG. 7 includes three top plan views illustrating the steps encountered in sealing the sheets in the plastic wrap;

FIG. 9 is a partial sectional view of a sealed and severed plastic seam;

FIG. 11 is a partial sectional view of a sealed only plastic seam; and

FIG. 12 is a schematic block diagram of the heat sensing and controlling apparatus of the invention.

DESCRIPTION OF THE PREFERRED EMBODIMENTS

Figure 1:
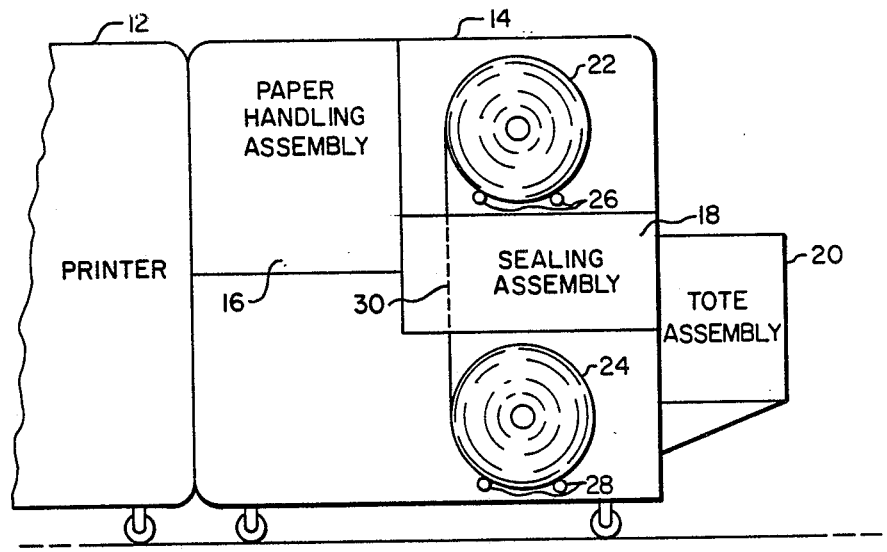
FIG. 1 is a schematic side elevational view of a wrapping and sealing machine constructed according to this invention and positioned for use with a high speed printer.

Throughout the following description, similar reference characters refer to similar elements or members in all of the figures of the drawing.

Referring now to the drawings, and to FIG. 1 in particular there is shown a high speed printer 12 whose output is connected directly to the wrapping and sealing apparatus 14. This sealing apparatus 14 is positioned next to the output end of the printer 12 so that no operator intervention is necessary to transfer sheets from the printer 12 for stacking and wrapping with a plastic film by the wrapping and sealing machine 14. It is emphasized that the sealer 14 may be used with copiers, duplicators, printers, and other apparatus which outputs a plurality of sheets of paper which may be stacked in predetermined numbers and bound by the sealing apparatus 14.

The sealing apparatus 14 includes the paper handling assembly 16, the sealing assembly 18, the storage, hopper, or tote assembly 20, and the rolls of plastic film material 22 and 24 which are positioned on rollers 26 and 28, respectively. Briefly, the paper handling assembly 16 functions to collect sheets from the printer 12 and arrange them into stacks for movement into the sealing assembly 18 where they are wrapped and sealed with a plastic film 30. After sealing, the sealed stack of sheets is transported to the removable tote tray or assembly 20 for pick-up or transport further into the distribution system.

Figure 2:
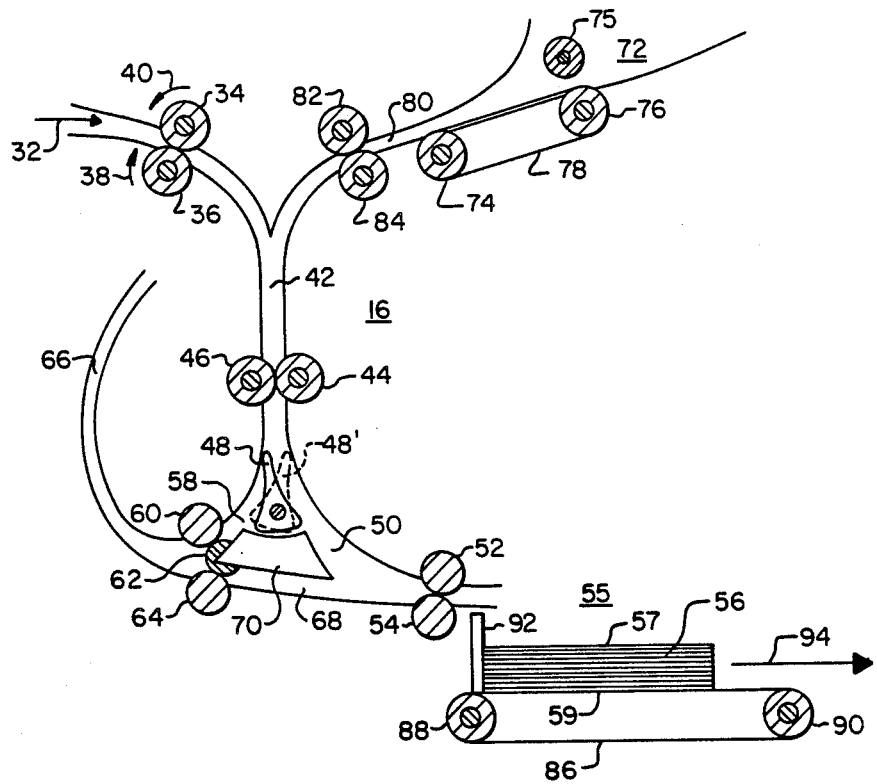
FIG. 2 is a schematic elevational view of the paper handling assembly shown in FIG. 1.

FIG. 2 illustrates the preferred embodiment for the paper handling assembly 16 shown in FIG. 1. According to FIG. 2, sheets outputed from the printer 12 are guided into the path 32 where the rollers 34 and 36, rotating in the directions 38 and 40, aid in moving the paper sheets down into channel 42. The various gears, chains, belts, linkages, and other mechanical devices which would be used to drive the various rollers and mechanisms of the sealing apparatus are not shown in the figures of this invention since they are well within the ability of a skilled artisan to determine the need and placement thereof to make the device illustrated herein operational.

Once a sheet of paper enters the channel 42, the rotating action of the rollers 44 and 46 continue the motion of the paper in a vertical direction downward to the diverting portion of the paper handling assembly 16. The pivot member 48 is controlled, preferably from electrical signals from the printer 12, so that it can be positioned in one of two locations when the paper travels down channel 42. If the paper is to be stacked without inversion, the pivot member 48 is positioned as shown by the solid lines if FIG. 2. If the paper is to be inverted before being placed upon the stack, the pivot member 48 is moved to the position 48' shown by the dashed lines.

Assuming, in the first case, the sheet is not to be inverted, the sheet would travel down through channel 50 where it would be intercepted by the rollers 52 and 54 for pushing the sheet of paper out onto the stack 56. Any sheets coming from the printer and traveling through the channel 50 would not be inverted and would have the same orientation in stack 56. On the other hand, if inversion of the sheets was desired for proper placement in the stack 56, which is to be wrapped and sealed, the pivot member 48 would be placed in the position shown by pivot member 48'. This would cause the sheet of paper traveling down through channel 42 to be diverted into channel 58. Once in channel 58, the counter rotating rollers 60, 62 and 64 would push the sheet of paper up into the channel 66, which is also known as a J-inverter. The sheet of paper then is pulled by the rollers 62 and 64 through channel 68, the rollers 52 and 54, to the stack 56. It should be apparent that the movement of the sheet around and up into the channel 66 inverts the sheet so that when it is placed upon th stack 56 it is inverted from the position it had when entering the channel or path 32. Guide 70 is used to maintain an unobstructed flow of the paper sheets through the channel areas whether being inverted or traveling directly to the stack without being inverted.

The apparatus in FIG. 2 also includes a single sheet feed arrangement where, when it is desired, single sheets can be fed, as desired, for placement upon the stack of sheets 56. This is accomplished by inserting the sheets in the tray 72 where, upon feed command, the bottom sheet is conveyed by the feed belt 78 on rollers 74 and 76 into the paper flow channel 80. Friction retard roller 75 prevents multiple sheets from being fed at the same time. Sheets of paper present in channel 80 are pushed on further by the rotation of the rollers 82 and 84. These sheets eventually enter channel 42 and subsequently are either inverted or not inverted and placed upon the stack of sheets 56.

The stack of sheets 56 is positioned in the stacking try 55. Movement of the push bar 92, which may be driven by chains or belts, such as belt 86 around rollers 88 and 90, moves the stack of sheets 56 in the direction indicated by the arrow 94. The stack 56 includes four sides, plus a top 57 and a bottom 59. Movement of the stack of sheets 56 in direction 94 moves the sheets into engagement with the plastic film 30 in the sealing assembly 18, as shown in FIG. 1. More detail of the sealing assembly is shown in other figures of the drawing. It is emphasized that, should it be desirable to use the sealing apparatus 14 as a manual wrapping and sealing station which is not dedicated to the output of a specific machine, the paper handling assembly 16 shown in FIG. 2 may be omitted and the work or stack of sheets to be wrapped and sealed would be placed in the stacking tray 55 or on a conveyer belt, such as belt 86.

Figure 3:
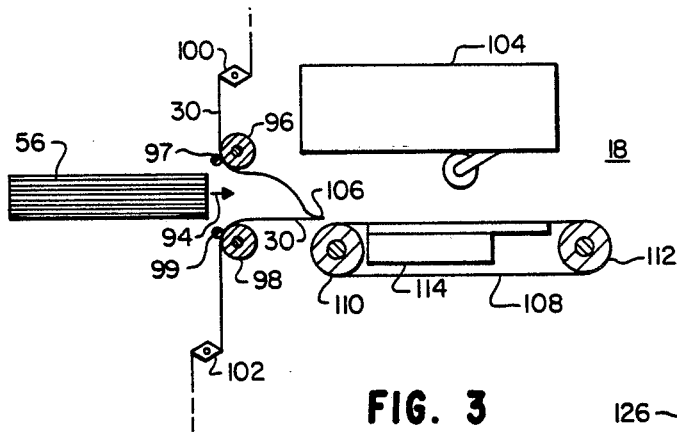
FIG. 3 is a schematic elevational view of the sealing assembly shown in FIG. 1 illustrating one step in the wrapping and sealing process.

FIG. 3 illustrates the main components of the sealing assembly 18 of FIG. 1. At this stage of the wrapping and sealing operation, the stack of sheets 56 is ready for movement into the sealing assembly 18. The direction of movement is indicated by the arrow 94. The selected material to wrap the stack of sheets 56 is illustrated, in this preferred embodiment, as a polyethylene plastic film material 30 which extends across rollers or feed nips 96 and 98. This film material can have a thickness of about 2 mils, although other thicknesses are within the contemplation of the invention. The plastic film extends through tensioner 100 to the upper roll of the plastic material and through or around the lower tensioner 102 to the lower roll of the plastic film material. The position of the tensioner controls the rotation of the plastic rolls, thus limiting the effect of the inertia of the rolls on the amount of plastic fed through nips 96, 97, 98 and 99.

The movable sealing head or pressure bar assembly 104 is in its upright position for the movement of the stack of sheets 56 into engagement with the plastic film 30. The area 106 of the plastic film 30, shown in FIG. 3, includes a thermal seal area which was produced during the last wrapping and sealing operation, which will be better understood following the description of a complete cycle of wrapping and sealing of the plastic sheets 56. Pushing the sheets 56 in the direction 94 engages the sheets with the plastic film 30 which is fed at the same speed by nips 96, 97, 98 and 99 and wraps the film around the stack of sheets 56. Continued movement of the sheets 56 is aided by the conveyor belt 108 which is driven by the rollers 110 and 112. The conveyor system may be a vacuum conveyor system wherein a fan or a vacuum source 114 pulls a slight vacuum underneath a porous belt so that the plastic which comes in contact with the belt 108 is pulled in the direction 94 toward the final position for sealing.

Figure 4:
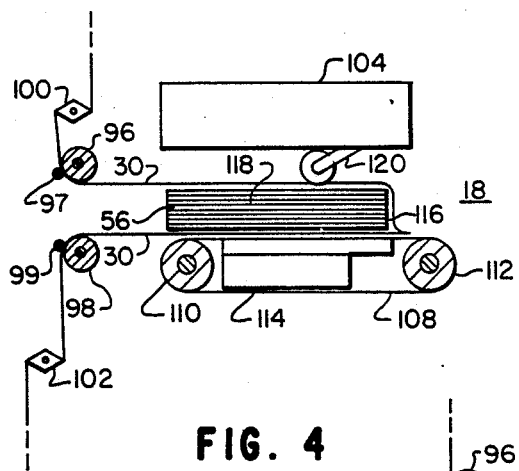
FIG. 4 is a schematic elevational view of the sealing assembly during another step in the process.

FIG. 4 illustrates the position of the stack of sheets 56 immediately after it is positioned at the correct location for sealing, and immediately before the sealing operation commences. At this location, the plastic film material 30 is wrapped around the front or leading side 116 of the stack, and, because of the width of the plastic film 30, the side 118 and the other side which cannot be seen in FIG. 4 is also wrapped with the plastic material 30. Once in this position, normal force roller 120 comes down onto the stack and keeps the stack and plastic in the same relative position as the pressure bar assembly 104 moves in a downward direction. After the seal has been made, the normal force roller 120 remains in contact with the stack as the pressure bar assembly 104 is raised, thus stripping the plastic and stack off the upper bar. The conveyer belt 108 then resumes moving in direction 94 and the stack is driven into the tote or hopper assembly, away from the plastic web and lower pressure bars.

Figure 5:
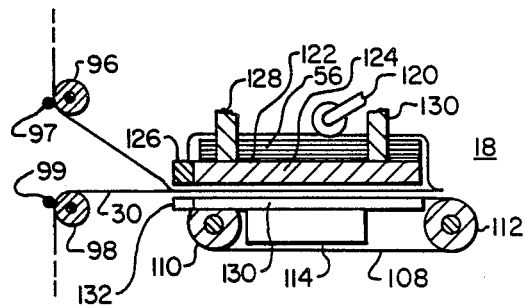
FIG. 5 is a schematic elevational view of the sealing assembly during still another step in the process.

FIG. 5 illustrates a cut-away portion of the pressure bar assembly 104 during the actual sealing operation. A U-shaped upper sealing pressure bar structure 122 is positioned down around the stack 56 as shown in FIG. 5. The pressure board structure 122 includes a side pressure bar 124, a similar pressure bar located on the other side of the stack 56, and a pressure bar 126 which extends between the two parallel pressure bars which are located on opposite sides of the stack 56. Supports 128 and 130 are simply used to move the pressure bar structure 122 down over the stack 56.

The upper sealing pressure bar structure 122 mates with a similarly shaped pressure bar structure located on the lower side of the plastic film 30. This lower bar structure includes pressure bar 130 which extends in a longitudinal direction, that is, the direction which is parallel to the direction of travel of the stack of sheets 56 into and out of the sealing station. A similar pressure bar is located on the other side of the stack 56, and the third pressure bar 132 is located perpendicularly to the two other pressure bars.

The sealing operation which takes place when the apparatus is in the position shown in FIG. 5 will be described somewhat with other figures of the drawing. However, briefly stated, the sealing operation produces heat and pressure around three of the sides of the stack 56, between the two layers of plastic film material which is positioned between the upper and lower pressure bar structures. The pressure bars which are oriented in the direction of travel of the stack 56 through the sealing station, such as bars 130 and 124, and their counterparts on the back side of the stack 56, merely perform a non-severing, or flat seal, which simply welds the thermoplastic material together. None of the excess is trimmed from the seals made by these pressure bars. On the other hand, the pressure bars 126 and 132 are constructed and arranged to perform a severing, or trim, seal at the trailing edge or side of the stack of sheets 56. One reason for this type of seal is so that the sealed stack of sheets can be separated form the plastic film 30, and that the plastic film 30 will be sealed together and ready for receiving the next stack of sheets.

FIG. 6 briefly shows an arrangement for stacking the finished wrapped and sealed stacks of sheets for future use or delivery. The previously wrapped and stacked sheets 134 are positioned on a platform 136 which can be moved vertically up and down to allow additional stacks to be placed thereon. In other words, when the conveyor 108 rotates in a direction to place the stack 56 on top of the other stacks of sheets, the platform 136 would be indexed down a known amount to allow for the next stack of sheets to be placed thereupon. Obviously, many other arrangements of output totes, handling conveyors, or trays can be used within the contemplation of the invention for the storage location.

FIG. 7 shows the stack of sheets 56 in three different stages of the wrapping and sealing process. Assuming that the views of FIG. 7 are taken from overhead the sealing station, the stack of sheets 56 is first shown simply wrapped with the plastic material 30. This basically corresponds to the stage of the operation represented by FIG. 4. The next step in the operation, which is represented by FIG. 5 herein, is depicted by the center view of FIG. 7. In this view, the upper pressure bars 124, 125 and 126 have come down into position around the sides of the stack of sheets 56. After the thermal land pressure process, the plastic film is severed and the stack of sheets 56 is completely encased or wrapped in an enclosed plastic sheath or envelop. As shown in the third view of FIG. 7, the non-severing seals 140 and 138 are produced by the pressure bars 124, 124', 125 and by the lower mating bar of bar 125, which is not illustrated. Note that there is a portion of the plastic material located outside the sealed areas 138 and 140 which is not trimmed during the wrapping and sealing operation. This has advantages in that the amount of waste is minimal and the machine need not have the capability of trimming these seals or of removing the trimmed pieces from the sealing area. It is also pointed out that the other parallel seams of the package, which are seams 142 and 144, are of the severed type in which the sealing operation severed the envelop from the remaining plastic film material.

Figure 8:
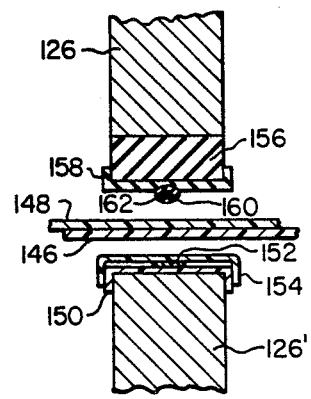
FIG. 8 is a sectional elevational view along line 8—8 of FIG. 7 showing a pressure bar assembly used to seal and sever the plastic layers.

FIG. 8 is a cross-sectional view taken across line 8—8 of FIG. 7. As shown in FIG. 8, the upper pressure bar 126 is mated to a lower pressure bar 126' on the other side of the plastic layers 146 and 148. The lower pressure bar assembly 126' also includes, in this specific embodiment, a layer of insulated tape 150, a high resistance flat heating element 152, and a top layer of insulating material 154. The insulating members 150 and 154 can be TEFLON tape, and the flat heating element 152 can be nickel chromium wire. It is within the contemplation of this invention that the pressure bar assembly can be reversed, with bar 126' being the upper bar and bar 126 being the lower bar.

The upper pressure bar assembly 126 includes a resilient material 156 which is covered with a TEFLON tape 158. Extending across the face of the upper pressure bar assembly 126 is a cut-off wire 160 which is covered with a suitable adhesion limiting material 162, such as TEFLON. The wire 160 is constructed of a suitable conducting material such that its resistance properties have a high thermal coefficient of resistance. Since nickel chromium wire, as used for wire 152, has a low thermal coefficient of resistance even though it has a high resistance, a nickel chromium wire for the wire 160 would not be preferable according to this embodiment of the invention. A more suitable material would be spring steel coated with TEFLON which would give the high coefficient of thermal resistivity. Nickel chromium wire has a resistance change of only a few percent over the heat range subjected to the wire 160, whereas spring steel wire has a much greater change in resistance under similar conditions.

During the sealing operation, the pressure bars shown in FIG. 8 are moved together so that heat and pressure is applied to the plastic layers 146 and 148. The heat supplied to the seal area is furnished solely by the heating element 152. It is emphasized that no electrical current for the purpose of heating is conducted through wire 160. The purpose of wire 160 is to sever the plastic layers substantially in the middle of the seal area. During the engagement of the pressure bars, the cut-off wire 160 is pushed slightly into the resilient material 156 but protrudes enough therefrom to sever the plastic layers 146 and 148. In addition to severing the plastic layers, the wire 160 is used, as will be described later, to control the amount of heat applied to the seal area by the heating element 152.

FIG. 9 is a cross-sectional view of a severed film layer which has been sealed by the pressure bars shown in FIG. 8. According to FIG. 9, plastic film layers 145 and 146' have been severed, and plastic layers 148 and 148' have also been severed. The sealed areas 162 and 164 are the result of the heat and pressure applied by the pressure bars, and the severed region 166 is a result mainly of the action of the cut-off wire 160. It is pointed out that this type of severing seal occurs across one edge of the sealed package during one step in the process, and a previous step produced a similar seal in the opposite and parallel side of the sealed package.

Figure 10:
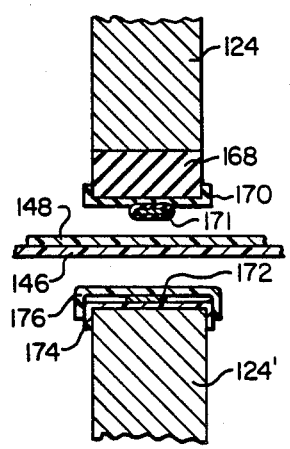
FIG. 10 is a sectional elevational view along line 10—10 of FIG. 7 showing a pressure bar assembly used to seal without severing the plastic layers.

FIG. 10 illustrates the pressure bar structures used to make a non-severing type seal along the other two sides of the sealed package. FIG. 10 is a cross-sectional view taken across lines 10—10 of FIG. 7. According to FIG. 10, the upper pressure bar structure 124 is aligned with a lower pressure bar structure 124'. In an arrangement similar to the pressure bar structures of FIG. 8, pressure bar 124 has a resilient material 168 and an adhesion limiting material 170, such as TEFLON, positioned across the resilient material 168. The lower pressure bar structure 124' includes the heating element 172 and layers 174 and 176 of a suitable insulating and adhesion limiting material, such as TEFLON. The heating element 172 may be a flat nickel chromium wire which has a high resistance. The major difference between the heating bar structures of FIG. 10 and FIG. 8 is that the structure in FIG. 10 has a flat wire 171 across the bar. Thus, the seal produced when the pressure bars move together on the plastic layers 146 and 148 and apply heat from the heating element 172 is a non-severing type seam or seal. Although wire 171 does not sever the seal, it may be used for temperature measurement in the seal area. In applications where temperature measurement is not required, wire 171 may be omitted from pressure bars making non-severing type seams.

FIG. 11 illustrates the type of seal made by the pressure bars shown in FIG. 10, which are positioned on two opposite sides of the stack being sealed. According to FIG. 11 the plastic layers 146 and 148 are sealed together at the region 178. Since the pressure bar structure did not include a cut-off wire, the seal area 178 remains intact and the plastic film layers are not severed as they are in FIG. 9. The non-severing type seal, or flat seal, shown in FIG. 11 is used on two opposite and parallel sides of the sealing package, substantially located along the edges of the plastic film material which is wrapped around the stack of sheets.

FIG. 12 is a block electrical diagram of a circuit which is used in conjunction with the pressure bar structures to control the amount of heat applied to the seal area by the pressure bar structures. The circuit of FIG. 12 would be used in conjunction with the pressure bar structures shown in FIG. 8 which are used to make the severing type seal across the plastic film. According to FIG. 12, the pressure bar 126 has the cut-off wire 160 extending across the face of the pressure bar. The pressure bars 124, 125 and 126 shown in FIG. 12 are viewed from underneath these upper pressure bars in a position which would be seen by the plastic film material being sealed. Thus, cut-off wire 160 would come into contact with the upper layer of the plastic film.

The cut-off wire 160 is electrically connected by the conductors 180 and 182 to the bridge circuit 184. In the bridge circuit 184, the resistance of the wire 160 becomes one leg of an electrical bridge circuit for detecting a change in resistance in the wire 160 produced by heat from the heating element associated with the mating pressure bar assembly 126'. In a manner conventional and known by those skilled in the art, the bridge circuit develops a voltage which is applied to the pulse length controller 186. This applied voltage is dependent upon the resistance of the wire 160. Depending upon the applied voltage, the controller 186 controls the heater pulse supply 188 for the purpose of regulating the amount of heat supplied by the flat heating element 152 shown in Fig. 8. In this preferred embodiment of the invention, a pulse supply is used to provide the electrical current for heating the heating element. Therefore, the controller 186 primarily controls the length of the pulse in order to apply the right amount of heat to the sealing area. While the circuit of FIG. 12 is sufficient to accomplish the desired result, it is within the contemplation of this invention that other circuit arrangements and components may be used to control the heating element based upon the resistance of the cut-off wire 160.

This temperature controlling apparatus of this invention offers a unique advantage over previously known temperature control circuits. Since the cut-off wire is located on the opposite side of the plastic film layers from the heating element, a true reading of the temperature of the seal area is acquired since the temperature influencing the resistance of the wire 160 must be that which travels through the seal area. In this respect, the resistance of wire 160 is predominantly controlled by the temperature in the seal area rather than the temperature of the heating element or of the surroundings. Because of the high thermal coefficient of resistivity of the wire 160, as opposed to a low coefficient of thermal resistivity of typical nickel chromium wires, it is easier and more accurate to measure the change in resistance in the wire 160 than it would be in a nickel chromium wire, regardless of whether or not the wire was used as a heating element. Therefore, by the unique combination of a non-heated, high coefficient of resistance wire located on the opposite side of the plastic seal area from the heating source, and an electrical circuit responsive to the resistance of the wire to control the heating of the heating element, a superior seal can be achieved with just the right amount of heat to properly seal the plastic layers and to sever the seal in the middle thereof.

There has been disclosed herein a wrapping and sealing machine which is suitable for use with high speed printers and copiers to package stacks of paper sheets. The apparatus is compact, full featured, and provides excellent package seals due to the unique cut-off arrangement and to the improved temperature control.

It is emphasized that numerous changes may be made in the above-described apparatus without departing from the teachings of the invention. It is intended that all of the matter contained in the foregoing description, or shown in the accompanying drawings, shall be interpreted as illustrative rather than limiting.

We claim:

1. Apparatus for wrapping and sealing a stack of flat sheets said apparatus comprising:
   means for collecting a stack of sheets to be wrapped and sealed, said stack having four sides;
   means for moving said stack into engagement with a plastic film, with the engagement wrapping the film around the stack to provide top and bottom layers of film;
   means for thermally sealing together said top and bottom layers adjacent to three of the sides of said stack; and
   means for removing said stack from the sealing means and placing the wrapped and sealed stack into a storage location;
   said sealing means being operable to thermally seal the three sides simultaneously, with two of the sides being parallel to each other and positioned longitudinally in the direction of movement of the stack into engagement with the plastic film, and with the third sealed side being perpendicular to said two other parallel sides, said third side being sealed with the severing type seam which severs the plastic film substantially in the middle of the seam.

2. The wrapping and sealing apparatus of claim 1 wherein the sealing means includes, for making said severing type seam, a heated pressure bar located on one side of the plastic film and a non-heated pressure bar located on the other side of the plastic film, said pressure bars being movable relative to each other to apply heat and pressure to the plastic film layers, with said non-heated pressure bar having a cut-off wire positioned across the face thereof for severing the plastic film.

3. The wrapping and sealing apparatus of claim 1 wherein the two parallel sides are sealed with a non-severing type seam.

4. The wrapping and sealing apparatus of claim 1 wherein the collecting means includes means for routing sheets directly from the output of a printer to the stack which is to be wrapped and sealed.

5. The wrapping and sealing apparatus of claim 4 wherein the collecting means includes means for inverting sheets from the printer before being positioned on the stack which is to be wrapped and sealed.

6. The wrapping and sealing apparatus of claim 4 wherein the collecting means includes means for accepting individually fed sheets.

7. The wrapping and sealing apparatus of claim 1 wherein the collecting means includes means for manually placing therein pre-stacked sheets of paper to be wrapped and sealed.

8. The wrapping and sealing apparatus of claim 2 wherein the cut-off wire is connected to an electrical circuit which uses a change in the resistance of the cut-off wire to detect the amount of heat present on the non-heated side of the plastic film.

9. The wrapping and sealing apparatus of claim 8 wherein the cut-off wire is fabricated of a material having a high thermal coefficient of resistance.

10. The wrapping and sealing apparatus of claim 9 wherein the cut-off wire is constructed of TEFLON coating spring steel wire.

11. The wrapping and sealing apparatus of claim 8 wherein the electrical circuit controls the heat supplied to the heated pressure bar.

12. The wrapping and sealing apparatus of claim 11 wherein the electrical circuit includes a bridge circuit with one leg of the bridge circuit electrically being the cut-off wire, and wherein the heat is controlled by regulating, in response to the resistance of the cut-off wire, the length of time current is supplied to an electrical heating element on the heated pressure bar.

13. Apparatus for wrapping and sealing a stack of flat sheets from a printing device, said apparatus comprising;

paper handling means for accepting sheets from the output of the printing device, said handling means including means for selectively inverting the sheets and for arranging the sheets into a stack having four sides;

means for moving said stack of sheets perpendicularly into engagement with a plastic film, with the engagement wrapping the film around the stack to provide top and bottom layers of film;

means for thermally and simultaneously sealing together said top and bottom layers adjacent to three of the sides of said stack, with two of the sides being parallel to each other and positioned longitudinally in the direction of movement of the stack into engagement with the plastic film, and with the third side extending between said first two sides, said first two sides being sealed with a non-severing type seam and said third side being sealed with a severing type seam which severs the plastic film substantially in the middle of the seam; and means for removing the stack from the sealing means and placing the wrapped and sealed stack into a storage location;

said sealing means including, for making the severing type seam, a heated pressure bar located on one side of the plastic film and non-heated pressure bar located on the other side of the plastic film, said pressure bars being movable relative to each other to apply heat and pressure to the plastic film layers, with said non-heated pressure bar having a round cut-off wire positioned across the face thereof for severing the plastic film.

14. The wrapping and sealing apparatus of claim 13 wherein the apparatus also includes first and second rolls of plastic film, with the plastic film with which the stack of sheets move into engagement with being substantially centered at a severing type seam which joins together the plastic film from the two rolls.

15. The wrapping and sealing apparatus of claim 13, wherein the cut-off wire is electrically connected into a leg of an electrical bridge circuit which is responsive to the temperature department resistance of the cut-off wire, with the response being applied to a circuit which controls the heating of the heated pressure bar located on the other side of the plastic layers, said cut-off wire being fabricated of a material having a high thermal coefficient of resistance and being covered with a TEFLON coating.

16. The wrapping and sealing apparatus of claim 13 wherein the paper handling means includes means for accepting individually fed sheets.

17. Apparatus for providing thermal seals between layers of plastic film material, said apparatus comprising:

a heated pressure bar located on one side of the film material;

a non-heated pressure bar located on the other side of the film material;

means for moving said pressure bars together with the plastic film therebetween;

a non-heated wire positioned longitudinally across the face of the non-heated pressure bar; and means for electrically connecting said wire to an electrical circuit which controls the amount of sealing heat produced by the heated pressure bar, said control being in response to the resistance change of said wire produced substantially by heat conducted through the plastic film from the heated pressure bar.

18. The thermal sealing apparatus of claim 17 wherein the wire has a round cross-section to produce severing type seals.

19. The thermal sealing apparatus of claim 17 wherein the wire has a flat cross-section to produce non-severing type seals.

20. The thermal sealing apparatus of claim 17 wherein the wire is fabricated of a conducting material which has a high thermal coefficient of resistance.

21. The thermal sealing apparatus of claim 20 wherein the wire is fabricated of spring steel wire and coated with an adhesion limiting material.

22. The thermal sealing apparatus of claim 17 wherein the face of non-heated pressure bar located underneath the wire is covered with a resilient material.

23. The thermal sealing apparatus of claim 17 wherein the heated pressure bar includes a flat electrical heating element, said element being located across the face of the pressure bar and being covered with an adhesion limiting material.

* * * * *